United States Patent [19]

Yamamoto

[11] Patent Number: 4,580,278
[45] Date of Patent: Apr. 1, 1986

[54] READ CLOCK PRODUCING SYSTEM
[75] Inventor: Takaaki Yamamoto, Tokyo, Japan
[73] Assignee: Sansui Electric Co., Ltd., Tokyo, Japan
[21] Appl. No.: 545,290
[22] Filed: Oct. 25, 1983
[30] Foreign Application Priority Data Oct. 26, 1982 [JP] Japan .................. 57-186838

[51] Int. Cl.[4] .................. H04L 7/00
[52] U.S. Cl. .................. 375/106; 360/51
[58] Field of Search .............. 375/106, 111, 120, 119; 360/51; 370/13

[56] References Cited

U.S. PATENT DOCUMENTS

| | | | |
|---|---|---|---|
| 3,736,581 | 5/1973 | Breikss | 360/51 |
| 3,755,748 | 8/1973 | Carlow et al. | 375/106 |
| 3,949,170 | 4/1976 | Shionoya | 375/111 |
| 4,275,466 | 6/1981 | Yamamoto | 360/51 |

*Primary Examiner*—Douglas W. Olms
*Assistant Examiner*—Frank M. Scutch, III
*Attorney, Agent, or Firm*—Sughrue, Mion, Zinn, Macpeak, and Seas

[57] ABSTRACT

In a read clock producing system for generating a read clock signal which is used for extracting a digital information portion of a digital coded signal, the system comprises means for delaying a pulse obtained by comparing data with a certain threshold level, means for generating a clock pulse having a pulse width proportional to the delay, said generating means including a frequency division circuit, flip-flop and EOR means for comparing the pulse width with a predetermined pulse width, a differential amplifier for comparing the data with a second threshold level adapted to change in accordance with the above comparison, and the control means for controlling the delay by the use of an output from said comparison.

5 Claims, 3 Drawing Figures

READ CLOCK PRODUCING SYSTEM

BACKGROUND OF THE INVENTION

The present invention relates to an apparatus, such as the so-called rotary head type PCM (pulse-code modulation) tape recorder, wherein a transmission signal whose digital information is formed of a digital coded signal including synchronizing signals, for example, a pseudo video signal having a vertical synchronizing signal, a horizontal synchronizing signal and a time-sequential digital signal obtained by converting the digital information, is received through a transmission system (in this case, a recording/reproducing system, a modulating/demodulating system, etc. shall be included in the "transmission system"), and the original video digital information is detected and then used. More particularly, the invention relates to a read clock producing system for generating a read clock signal which is used for reading digital information, such as the aforementioned time-sequential digital signal in the transmission signal, from this transmission signal in synchronism therewith.

Rotary head type PCM tape recorders include one of the PCM encoder/decoder type called, e. g., "PCM audio processor", one unitarily equipped with a recording/reproducing system, etc. In any type, VTRs (video tape recorders) are applied to recording/reproducing systems in many cases. For this reason, digital information subjected to PCM is further converted into a pseudo video signal, which is inputted to or outputted from the recording/reproducing system.

In case of, e. g., the PCM audio processor, the pseudo video signal is composed of vertical synchronizing pulses, horizontal synchronizing pulses, a time-sequential digital signal portion obtained by converting the original digital information, and a white level reference signal. The digital signal portion is further divided into a data control signal, a data synchronizing signal and a data portion.

In the PCM audio processor, in decoding the original digital signal from the pseudo video signal reproduced by the VTR (in this case, a cassette type VTR for domestic use is principally utilized) which is the recording/reproducing system connected to the audio processor, data is usually derived in such a way that the digital signal portion in the pseudo video signal including the synchronizing signals and the digital signal is compared with threshold levels by comparators and is thus waveshaped, whereupon the resulting extracted signal is latched by a clock signal synchronous with the bit repetition of the data of the digital signal portion. The clock signal needs to have a frequency identical to the frequency of the time-sequential data signal. In case of generating such clock signal, it is considered to apply the phase lock by utilizing that vertical synchronizing signal of the video signal which is given as a recurrent signal. With this measure, however, a considerable difference is involved between the frequencies of the vertical synchronizing signal and the recurrent signal of the data, and the frequency division ratio of a frequency divider of PLL (phase-lock loop) for producing the required recurrence frequency of the data becomes very great. Therefore, when a jitter arises within one vertical synchronizing period, a phase lag develops between the vertical synchronizing signal and the frequency-divided signal at each time of the frequency division in correspondence with the delay of the frequency divider which is, e. g., a flip-flop or a counter. Accordingly, the phase deviation is involved in the relationship of synchronism between the data of the pseudo video signal and the clock signal obtained from the vertical synchronizing signal by dividing the frequency of the vertical synchronizing signal, and the data cannot be correctly latched.

Therefore, it has heretofore been attempted to solve the problem by, for example, applying the phase lock with the horizontal synchronizing signal.

In case of applying the phase lock with the horizontal synchronizing signal, however, an arrangement for preventing the influences of erroneous detection, noise etc. and an arrangement for processing a vertical synchronizing signal portion need to be disposed for the reasons that the horizontal synchronizing signal is more difficult of detection than the vertical synchronizing signal and is liable to incur the influences of the erroneous detection, noise etc. and that the vertical synchronizing signal portion etc. come to require special processing. This system accordingly brings about the problems that a complicated circuit arrangement is necessitated and that a stable operation is not readily attained.

In order to cope with the problems stated above, the inventor has previously proposed as Japanese patent application No. 57-104981 a system which can produce a read clock signal properly synchronized with data even by the phase lock utilizing the vertical synchronizing signal.

In this system, a signal at a frequency integral times that of the read clock signal as required by the phase lock loop is obtained on the basis of a synchronizing signal from a transmission signal which is a digital coded signal including the synchronizing signal as received through a transmission system, and it has its frequency divided into the frequency of the read clock signal by a frequency division counter. In addition, at the point of time when the leading edge of a digital information portion succeeding the synchronizing signal has been detected, the frequency division counter is reset to adjust the phase of the read clock signal to that of the digital information portion. The output of the frequency division counter is used as the read clock signal. The detection of the leading edge of the digital information portion for the resetting can, concretely, be effected in such a way that the slope of the first rise or fall of the digital information signal succeeding the synchronizing signal is compared with a predetermined threshold level.

In this case, the adjustment of the threshold level makes it possible to adjust the timing of the resetting of the frequency division counter and to adjust the phase relationship between the digital information signal and the read clock signal. Thus, the system produces the read clock signal of optimum timing, namely, the read clock signal whose rise or fall lies substantially centrally of the data bit of the digital information signal.

With such system, however, notwithstanding that the optimum value of the threshold level ought to change in response to the change of an operating point due to variations with time or to the great change of the speed of the transmission signal, the set value of the threshold level is held fixed after the adjustment, so that the read clock signal of the optimum timing fails to be produced in some cases.

SUMMARY OF THE INVENTION

An object of the present invention is to provide a read clock producing system which realizes the automatic adjustment of the threshold level and which can generate a read clock signal of optimum timing at all times.

The present invention is characterized by comprising source clock generation means for generating a source clock signal at a frequency integral times that of a required read clock signal by the use of a PLL based on a synchronizing signal in a transmission signal, clock generation means for dividing the frequency of the source clock signal by means of a frequency division counter so as to generate a clock signal at a frequency equal to a bit rate of a digital information portion, resetting means for detecting a timing at which the transmission signal traverses a threshold level at a leading edge of a first digital information signal succeeding the synchronizing signal in the transmission signal, so as to reset said frequency division counter at a time of the detection, and level control means for detecting a phase difference between the digital information signal in the transmission signal and the read clock generated by said clock generation means and for variably controlling the threshold level of said resetting means so as to decrease the phase difference.

PREFERRED EMBODIMENTS OF THE INVENTION

Figure 1:
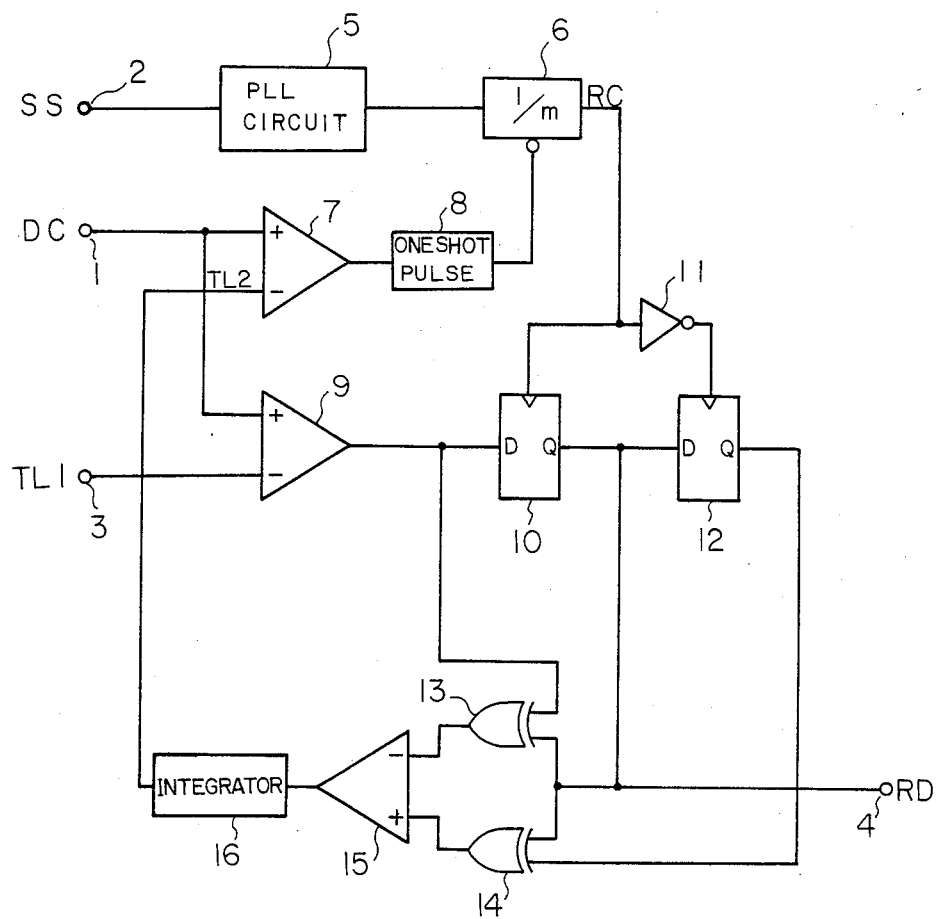
FIG. 1 is a block diagram showing the arrangement of an embodiment of the present invention.

FIG. 1 shows the arrangement of an embodiment of the present invention.

Referring to FIG. 1, numeral 1 designates a signal input terminal which is supplied from a transmission system with a digital coded signal DC including a synchronizing signal, for example, a pseudo video signal, numeral 2 a synchronizing signal input terminal which is supplied with the synchronizing signal SS detected and separated from the digital coded signal DC, numeral 3 a read level input terminal which is supplied with a first threshold level TL1 for reading the data of a digital information portion in the digital coded signal DC, and numeral 4 an output terminal from which read data RD is derived. Numeral 5 designates a PLL (phase-lock loop) circuit which generates a source clock signal at a frequency corresponding to m times (m: integer) the bit rate of the digital information, on the basis of the synchronizing signal SS received from the synchronizing signal input terminal 2, while numeral 6 designates a 1/m frequency division counter which divides the frequency of the source clock signal into a frequency of 1/m. A first comparator 7 is a voltage comparator which compares the digital coded signal DC received from the signal input terminal 1 and a second threshold level TL2 (the output of an integrator 16 to be described later), and which detects the leading edge of the digital information succeeding the synchronizing signal in the digital coded signal DC. A one-shot pulse generator 8 produces one shot of pulse when, owing to the detection of the leading edge, the output of the first comparator 7 has changed from "L" (a low level) to "H" (a high level) by way of example. The frequency division counter 6 is reset by the fall of the one shot of pulse. A second comparator 9 is a voltage comparator which compares the digital coded signal DC applied from the signal input terminal 1 and the first threshold level TL1 applied from the read level input terminal 3, and which extracts the digital information portion from the digital coded signal DC and then waveshapes it. To this end, the first threshold level TL1 is previously set near the middle level of the digital information portion of the digital coded signal DC. A first D (delay) flip-flop 10 latches the data waveshaped by the second comparator 9, at the time of the rise of a read clock signal RC which is outputted from the frequency division counter 6. Shown at numeral 11 is an inverter which inverts the output of the frequency division counter 6. A second D (delay) flip-flop 12 latches the output of the first D flip-flop 10 at the time of the rise of the output of the inverter 11, namely, the fall of the read clock signal RC. Numerals 13 and 14 indicate exclusive OR gates. The first exclusive OR gate 13 takes the exclusive logical sum between the output of the second comparator 9 and the output of the first D flip-flop 10, while the second exclusive OR gate 14 takes the exclusive logical sum between the outputs of both the first and second D flip-flops 10 and 12. A differential amplifier 15 is supplied with the output of the first exclusive OR gate 13 as an inverting input thereof and the output of the second exclusive OR gate 14 as a non-inverting input thereof, and it amplifies the difference voltage of the inputs. The integrator 16 integrates the output of the differential amplifier 15, that is, the difference between the outputs of both the first and second exclusive OR gates 13 and 14. As stated before, the output of the integrator 16 is applied to the first comparator 7 as the second threshold level TL2. The output of the first D flip-flop 10 is led to the output terminal 4, and becomes the read data RD.

Now, the operations of the embodiment thus arranged will be described.

Figure 2:
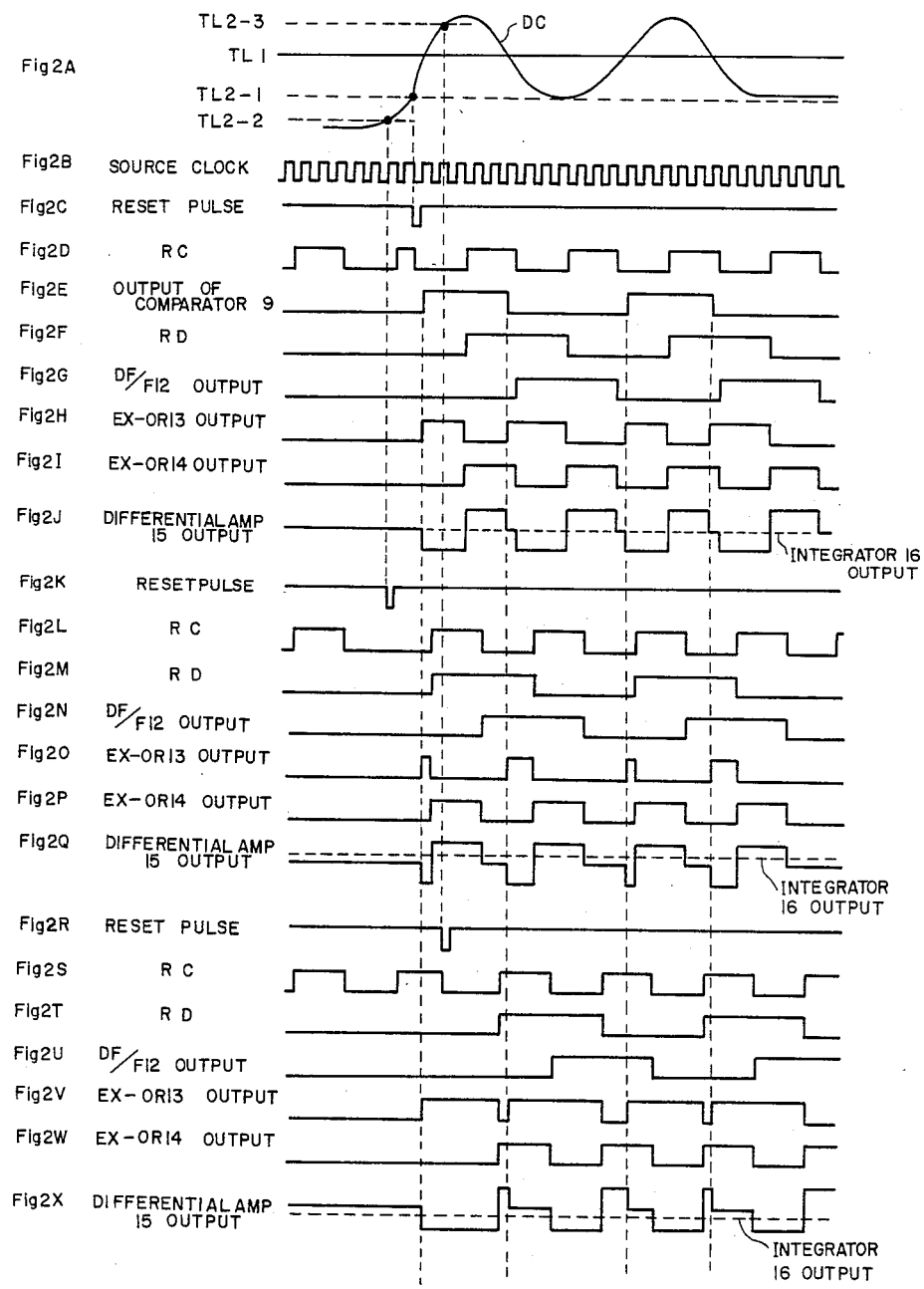
FIGS. 2A to 2X are waveform diagrams for explaining the operations of the embodiment shown in FIG. 1.

The signal input terminal 1 is supplied with the digital coded signal DC which has a waveform as exemplified in FIG. 2A. At this time, assuming that the threshold level TL2 of the first comparator 7 (the output of the integrator 16) be a level TL2-1 in FIG. 2A, when data DC exceed the level TL2-1, the output of the comparator 7 is activated, thereby triggering the one-shot pulse generator 8 and the output of the one-shot pulse generator 8 becomes one pulse determined by RC time constant of the generator 8 as shown in FIG. 2C and serves as the reset pulse of the frequency division counter 6. A waveform shown in FIG. 2B is the source clock signal produced by an internal oscillator, locking a phase of SS synchronous signal by using the PLL circuit 5. As stated before, the source clock signal has the frequency which is m times the bit rate, namely, a repetition frequency of logic "1" of the digital information portion of the digital coded signal DC. The frequency of this source clock signal is divided by m by means of the frequency division counter 6. Herein, since the frequency division counter 6 is reset by the aforementioned reset pulse, its output becomes a waveform as shown in FIG. 2D causing the start point of the fall thereof to be at the instant of the reset signal. This output of the frequency division counter 6 serves as the read clock signal RC. FIG. 2E shows the waveform of the signal produced in such a way that the digital coded signal DC is waveshaped by the second comparator 9 and taking "1" level when the digital coded signal DC exceeds the fixed threshold level TL1. This signal is latched in the first D flip-flop 10 at the rise of the read clock signal RC, so that a waveform shown in FIG. 2F is obtained and is delayed from the output of the comparator. The output of the first D flip-flop 10 is led to the output terminal 4, and becomes the read data RD. This output signal is further applied to the second D flip-flop 12 and latched therein at the fall of the read clock signal RC, whereupon a waveform in which RD waveform is delayed by RC pulse width as shown in FIG. 2G is delivered from the second D flip-flop 12. In this case, the phase difference between the digital information portion and the read clock signal RC is detected using the outputs of the second comparator 9, first D flip-flop 10 and second D flip-flop 12 (FIGS. 2E, 2F and 2G). Concretely, the detection is effected with the exclusive OR gates 13 and 14 and the differential amplifier 15. More specifically, the exclusive logical sum between the output of the second comparator 9 and that of the first D flip-flop 10 (FIGS. 2E and 2F) becomes a waveform whose width is changed in accordance with the delay of the RD waveform from the output of the comparator 9 as shown in FIG. 2H, and this signal is applied from the exclusive OR gate 13 to the inverting input terminal of the differential amplifier 15. In addition, the exclusive logical sum between the output of the first D flip-flop 10 and that of the second D flip-flop 12 (FIGS. 2F and 2G) becomes a waveform having a pulse width fixed to the pulse width of the RD waveform as shown in FIG. 2I, and this signal is applied from the exclusive OR gate 14 to the noninverting input terminal of the differential amplifier 15. Thus, the variable pulse waveform whose pulse width is changed in proportion to the phase difference between the RD waveform and the output waveform of the comparator 9 is applied to the inverted input of the differential amplifier 15 and the waveform of the fixed pulse width is applied to the noninverted input thereof. The output waveform of the differential amplifier 15 accordingly becomes as indicated by a solid line in FIG. 2J, and it is integrated by the integrator 16, whereby a voltage signal as indicated by a broken line in the figure is obtained. Herein, the output of the integrator 16 converges substantially to 0 (zero). This indicates that there has been almost no phase difference between the digital information portion DC and the read clock signal RC, in other words, that the optimum phasic relationship is held. Namely, the rising point of the RD waveform is at the central point of that portion of the digital coded signal DC which is over the fixed level TL1. Here, the expression "phase differences 0 (Zero)" signifies a case where the read clock signal rises in the middle of the data bit of the digital information portion.

Next, when the threshold level TL2 of the first comparator 7 is lower than the optimum value and is a level TL2-2 shown in FIG. 2A, the reset pulse to be impressed on the frequency division counter 6 is produced when the data waveform DC exceeds the level TL2-2 as shown in FIG. 2K. The read clock RC which becomes a level "0" when the reset pulse is produced and which has a constant repetition period, then, the read data RD which is formed by delaying the output of the comparator 9 to the next rise of RC, the output of the second D flip-flop 12 which is formed by delaying RD by the pulse width of RC and the outputs of the exclusive OR gates 13 and 14 which have the pulse width proportional to the phase difference between the output of the comparator 9 and RD waveform become waveforms as shown in FIG. 2L, 2M, 2N, 2O and 2P, respectively. As a result, the output of the differential amplifier 15 becomes a waveform as indicated by a solid line in FIG. 2Q. When this output is integrated by the integrator 16, the integrator output converges on the plus side as indicated by a broken line in the figure, for the area within the pulse width of the waveform of FIG. 2O is smaller than that within the pulse width of the waveform of FIG. 2P. This signifies that the phase of the read clock signal RC has led over the phase of the digital information signal. As the output of the integrator 16 becomes positive, a negative feedback is applied so as to raise the threshold level over the level of TL2-2 and the read clock signal RC is controlled to be delayed in phase.

Conversely, when the threshold level TL2 of the first comparator 7 is higher than the optimum value and is a level TL2-3 shown in FIG. 2A, the reset pulse to be impressed on the frequency division counter 6 is produced when the data waveform exceeds the level of TL2-3 as shown in FIG. 2R, and the read clock signal RC which becomes a level of "0" when the reset pulse is produced and which has a constant repetition period, then, becomes as shown in FIG. 2S. The read data RD, the output of the second D flip-flop 12 and the outputs of the exclusive OR gates 13 and 14 become as shown in FIGS. 2T-2W, respectively. As a result, the output of the differential amplifier 15 becomes a waveform as indicated by a solid line in FIG. 2X. When it is integrated by the integrator 16, the integrator output converges on the minus side as indicated by a broken line in FIG. 2X, for the area within the pulse width of the waveform of FIG. 2V is larger than that within the pulse width of the waveform of FIG. 2W. This signifies that the phase of the read clock signal RC has lagged over the phase of the digital information signal. As the output of the integrator 16 becomes negative, the negative feedback is applied so as to lower the threhold level under the level of TL2-3 and the read clock signal is controlled to be advanced in phase.

In this manner, when the second threshold level TL2 is lower than the optimum value, the phase of the read clock signal RC leads, and the output of the integrator 16 deviates on the plus side. In contrast, when the threshold level TL2 is higher than the optimum value, the phase of the read clock signal lags, and the output of the integrator 16 deviates on the minus side.

Since the output of the integrator 16 is applied to the first comparator 7 as the second threshold level TL2, the phasic relationship between the digital information signal and the read clock signal RC is automatically controlled so as to be corrected into substantially the optimum state, and appropriate data read is achieved.

In this case, the phase difference is detected at all the points of time at which the digital data is inverted, and the output of the integrator 16 varies depending upon frequency in the inversion of the data, thereby producing a jitter. In the actual use, however, the variation can be suppressed to a substantially negligible extent by adjusting the gain of the differential amplifier 15 and the time constant of the integrator 16.

Besides, in a case where only a part in which the same digital information exists infallibly, for example, the part of a head retrieval signal for data is gated and taken out every synchronizing signal, so as to detect the phase difference for only the digital data of this part, the frequency in the inversion of the digital data has no influence.

In the embodiment, when the phases of the digital information signal and the read clock signal have become optimal, the integrated signal converges to 0 (zero) as stated above. The convergence is momentary, and the second threshold level TL2 is permitted to maintain a substantially proper position by adjusting the time constant of the integrator 16 to be somewhat longer and the gain of the differential amplifier 15 to be somewhat greater.

Figure 3:
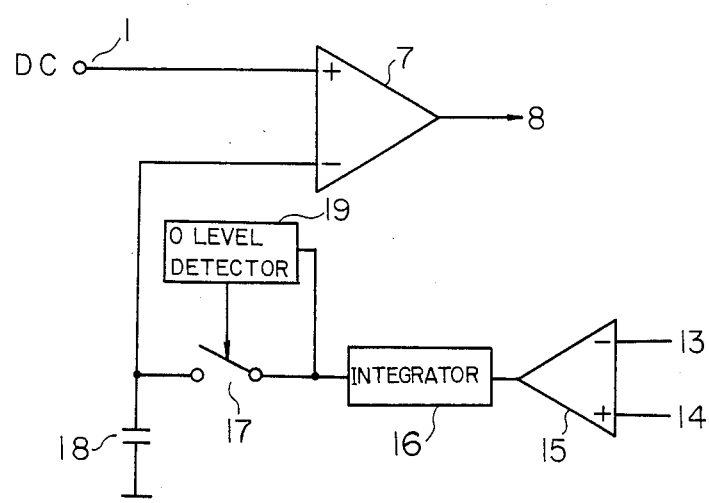
FIG. 3 is a block diagram of essential portions showing the arrangement of another embodiment of the present invention.

However, in order to produce the second threshold level TL2 more precisely and stably with the jitter lessened, a system as shown in FIG. 3 is considered. More specifically, a capacitor 18 is connected on the output side of the integrator 16 through a switch 17. This switch 17 is actuated so as to turn "off" only when the output of the integrator 16 is 0 (zero) (to turn "on" unless it is 0), by the output of a zero level detector 19 which operates in response to the output of the integrator 16, thereby keeping the optimum threshold level at the capacitor 18 for a longer period. When the output of the integrator 16 is not 0 (zero), it is used for charging the capacitor 18. The charged potential of the capacitor 18 is applied to the first comparator 7 as the second threshold level TL2. Thus, once the optimum threshold level is achieved, it is locked and maintained for a longer period.

Needless to say, the present invention can be performed as various modifications within a scope not altering the subject matter thereof, for example, by employing systems and arrangements other than mentioned above in detecting the phase difference between the digital information signal and the read clock signal.

According to the present invention, a read clock producing system can be provided which is capable of producing a read clock signal of substantially optimum timing at all times.

What is claimed is:

1. In a read clock producing system for generating a read clock signal which is used for deciding and extracting a digital information portion of a digital coded signal in case of decoding original digital information from a transmission signal that is delivered from a transmission system for transmitting the digital coded signal including a synchronizing signal; a read clock producing system comprising source clock generating means (2, 5) for generating a source clock signal at a frequency integral times that of the required read clock signal by the use of a phase-lock loop based on the synchronizing signal in the transmission signal, clock generation means (6) conneted to the output of said source clock generation means for dividing, the frequency of the source clock signal by means of a frequency division counter so as to generate a clock signal at a frequency equal to a bit rate of the digital information portion, a resetting means (7, 8) having its output connected to said clock generation means, for detecting a timing at which the transmission signal traverses a threshold level at a leading edge of a first digital information signal succeeding the synchronizing signal in the transmission signal, so as to reset said frequency division counter at a time of the detection, and level control means (9–16), having its input connected to the output of said clock generation means and having its outuput connected to the input of said resetting means for detecting a phase difference between the digital information signal in the transmission signal and the read clock generated by said clock generation means and for variably controlling the threshold level of said resetting means so as to decrease the phase difference.

2. A read clock producing system comprising means for delaying a pulse obtained by comparing data with a certain threshold level, means (6, 10), connected to the output of said delaying means, for generating a pulse having a pulse width proportional to the delay, means (12–15), connected to the output of said pulse generating means, for comparing the pulse width with a predetermined pulse width, and comparison means (7), connected to the output of said pulse width comparing means, for comparing the data with a second threshold level adapted to change in accordance with the output of said pulse width comparing means, wherein the delay caused by said delaying means is controlled by the output from said comparison means.

3. A read clock producing system according to claim 1, wherein said level control means comprises a comparator (9) which compares a fixed threshold level and data, a first flip-flop (10) which sets an output of said comparator in accordance with the frequency-divided clock signal, first exclusive OR means (13) for taking an EOR between an output of said first flip-flop and the output of said comparator and delivering a pulse width proportional to an amount of deviation of the threshold level, a second flip-flop (12) which sets the output of said first flip-flop in accordance with an inverted signal of the output of said frequency division counter, and second exclusive OR means (14) for taking an EOR between an output of said second flip-flop and the output of said first flip-flop and delivering a reference pulse width, whereby the threshold level is changed in correspondence with the timing of the resetting of said frequency division counter.

4. A read clock producing system according to claim 3 wherein said level control meansincludes a second comparator (15) for comparing the outputs of the first and second EOR's and an integrator (16) connected to the output of the second comparator.

5. A read clock producing system according to claim 3 wherein said level control means includes a second comparator (15) for comparing the outputs of the first and second EOR's, an integrator (16) connected to the output of the second comparator, a switch (17) connected to the output of the comparator and controlled to turn to "off" when the output of the integrator becomes "0" and a capacitor (18) connected to the switch for storing an optimum threshold level when the switch is off and for being charged by the output of the integrator when the switch is on.

* * * * *